United States Patent
Hayatdavoudi et al.

(10) Patent No.: US 11,085,288 B2
(45) Date of Patent: Aug. 10, 2021

(54) METHOD FOR DETERMINING PORE PRESSURE IN OIL AND GAS WELLS USING BASIN THERMAL CHARACTERISTICS

(71) Applicant: University of Louisiana at Lafayette, Lafayette, LA (US)

(72) Inventors: Asadollah Hayatdavoudi, San Ramon, CA (US); Sadiq Odubayo, Chicago, IL (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 16/738,388

(22) Filed: Jan. 9, 2020

(65) Prior Publication Data

US 2020/0149388 A1 May 14, 2020

Related U.S. Application Data

(63) Continuation of application No. 15/191,604, filed on Jun. 24, 2016, now Pat. No. 10,563,499.

(60) Provisional application No. 62/184,961, filed on Jun. 26, 2015.

(51) Int. Cl.
G06G 7/48 (2006.01)
E21B 47/06 (2012.01)
E21B 43/00 (2006.01)

(52) U.S. Cl.
CPC .............. *E21B 47/06* (2013.01); *E21B 43/00* (2013.01); *G01V 2210/00* (2013.01)

(58) Field of Classification Search
CPC .......... G01V 3/38; G01V 3/32; G01V 99/005; G01V 1/306; G01V 3/12; G01V 2210/66; G01V 2200/16; G01V 1/345; G01V 5/107; G01V 1/28
See application file for complete search history.

(56) References Cited

U.S. PATENT DOCUMENTS 5,321,612 A * 6/1994 Stewart .................... G01V 1/00
374/136

OTHER PUBLICATIONS

Shaker Reservoir vs. Seal Pressure Gradients: Perception and Pitfalls Based on Case Histories From the Gulf of Mexico CSEG Recorder, Apr. 2012 (Year: 2012).*
Cardoso et al. Heat Flow in the Campos Sedimentary Basin and Thermal History of the Continental Margin of Southeast Brazil Hindawi Publishing Corporation ISRN Geophysics, vol. 2014, Article ID 384752 (Year: 2014).*

* cited by examiner

*Primary Examiner* — Rehana Perveen
*Assistant Examiner* — Cuong V Luu
(74) *Attorney, Agent, or Firm* — Jessica C. Engler; Russel O. Primeaux; Kean Miller LLP (57) ABSTRACT

This inventive method provides a novel way of modeling basins in planning the drilling of crude oil and natural gas wells by accounting for thermodynamic considerations in tracking the pore pressure of a location of interest. By plotting the energy gradients, heat flux, and thermal conductivity of the location of interest, the user can more accurately identify the location of the Top of Geopressure and additional pertinent information during the well drilling planning process that can reduce costs and increase the safety of the process.

9 Claims, 8 Drawing Sheets

METHOD FOR DETERMINING PORE PRESSURE IN OIL AND GAS WELLS USING BASIN THERMAL CHARACTERISTICS

This application is a continuation of U.S. Nonprovisional patent application Ser. No. 15/191,604 filed Jun. 24, 2016, which claims the benefit of U.S. Provisional Patent Application No. 62/184,961 filed on Jun. 26, 2015. The disclosure of the referenced application is hereby incorporated herein in its entirety by reference.

The present invention relates to the field of safety and accuracy in crude oil and natural gas well drilling, particularly the use of thermodynamic principles in order to develop a new method for safely and accurately conducting crude oil and natural gas well drilling.

BACKGROUND OF THE INVENTION

Well blowouts are caused by the uncontrolled release of crude oil or natural gas well after a well's pressure control systems have failed. Given the threat to life and adverse impact on property and environment that a blowout can have, significant planning and precautions are undertaken when drilling the well. As part of safe drilling practices, persons who drill wells must consider several factors when planning a well, including pore pressure determination. The Pre-drill estimation of pore pressure and fracture gradient analysis is the bedrock of the well-planning process. Optimal pore pressure and fracture gradient estimates rely on the accuracy of overburden gradient calculations, which signify the characteristics of a given basin. If overburden or vertical stress gradient calculations are off, then pore pressure and fracture gradient estimates may be grossly underestimated or overestimated, both of which can result in severe wellbore instability and/or well control issues.

"Geopressure" refers to a subterranean earth formation where the fluid pressure of the pores exceeds hydrostatic. More specifically, Terzaghi's Principle states that all quantifiable changes in stress to a soil (e.g., compression, deformation, shear resistance) are a direct result of a change in effective stress. The effective stress $\sigma'$ is related to total stress $\sigma$ and the pore pressure u by the relationship $\sigma = \sigma' + u$ reading that total stress is equal to the sum of effective stress and pore water pressure.

Subsequently, the above authors defined the effective stress of a system as the difference between the total overburden of overlying sediments and the pressure of fluids occupying the pores of rock material. Later the oil and gas industry defined the "normal" pressure as the Salt water gradient or 0.465 psi/ft for the Gulf of Mexico and any pressure in excess of normal gradient as "abnormal" pore pressure.

Yet, an inherent weakness in Terzaghi's Principle is that it fails to incorporate additional thermally induced pressure into the equation. In addition, this theory does not relate the thermal properties of the rock formation and heat flow—that is specific to shale and sandstone formations—to the location and magnitude of Formation Pore Pressures. Terzaghi's approach to the compaction-dominated system does not need to take into account the effect of "high" Temperature and Thermal Conductivity of rock material but it would have been appropriate to have included the cold and low temperatures. This is because unusual pressures are often seen to affect the freeze-thaw cycles which in turn affect the shape of pores and in places such as Alaska affects certain surface pressures. For example, the contribution of temperature or geochemical reactions to the effective stress gradient is not represented in either Terzaghi's equation or the publications by the above mentioned authors.

Although thermodynamic or related properties associated with temperature are recognized by the petroleum industry; the experts, especially those engaged in serious basin modeling, have not used it in conjunction with the existing pore pressure estimation model. Because failure to properly calculate pore pressure can threaten the health and safety of workers and the environment, a method to properly mitigate these concerns and aid in the economic recovery of natural resources is desirable.

SUMMARY OF THE INVENTION

The disclosed invention describes a method for determining the pressure at various depth points in a proposed oil or gas well location that considers certain thermodynamic properties. These properties now considered include thermal conductivity at different points within the proposed well and the heat flux at those points. These different data sets provide more information that can lead to a more effective, efficient and safe drill of the well.

In this method, the user creates several plots of data that is related to the depth of the proposed well. Included charts include the depth of the well against temperature, resistivity, and pressure. The pressure of the various points is analyzed using both the Eaton method and the DWC method. Using the pressure and resistivity, the thermal conductivity and heat flux can be determined for different depths. Based upon the generated graphs, the user can more accurately estimate the location of the Top of Geopressure (TOG), changes in pressure mechanism dominance below the TOG, as well as the possible location of hydrocarbons within the proposed well location.

DETAILED DESCRIPTION OF THE INVENTION

The method described herein is a new method for analyzing pore pressure during pre-drilling planning for crude oil and natural gas wells in order to perform higher accuracy basin modeling. This novel method first develops and applies the concept of thermal equilibrium in the pressure-temperature space. Basin modeling is then used to analyze pore pressures along the depth of the interest and evaluate the effectiveness of seals as a barrier to heat flux. Data has suggested that an effective seal ideally prevents the leakage of pressure and temperature simultaneously from the system.

Eaton's work is used as the foundation for correlating the Resistivity Log (ohm-meter) values in normal and abnormal pressures across the SP 9-mv) values of shale through the following, known equation (hereinafter "Eaton's Correlation"):

$$P/D=S/D-0.535(\text{observed shale resistivity/normal resistivity})^{1.2}$$

In Eaton's Correlation, P/D, S/D, and 0.535 represent pressure gradient, overburden gradient, and normal effective stress value, respectively. Eaton's work developed a simple relationship that predicts the formation pore pressure by knowing the normally pressured compaction treadline, the observed resistivity/conductivity data and a relationship for formation overburden stress. Eaton's Correlation is also another form of Terzaghi's effective stress theory, which is correlated to Normal and Abnormal resistivity values. Because those having skill in the art are familiar with Eaton's Correlation and its simplicity, and resistivity values give better estimates of normal/abnormal pressures (as compared to other log data), this equation was selected to represent the Gulf Coast compaction process.

The temperature-depth relationship suggests that temperature gradient increases with depth in a linear fashion. Pressure is a function of depth and increases at deeper levels, thus this method considers that an over-pressured region in a field could exhibit high temperatures. This linear relationship between pressure and temperature defines the equilibrium of the system and is used to draft a pressure-temperature plot.

The earth, containing various materials (e.g., shale, sandstone, salt, clays, minerals, limestone, dolomite, and chert), is subject to a variety of temperatures and pressures to such a degree that the earth acts like a reactor. A number of different reactions may occur, including processes that lead to abnormal Formation Pore Pressure to develop. In these processes, the reactions obey the following fundamental law:

$$\Delta G=\Delta H-T\Delta S=\Delta VP-T\Delta S \quad \text{("Equation 1")}$$

In this equation, $\Delta G$ (Gibbs free energy) is the energy available to perform work. If $\Delta G$ is negative, the reaction will be instantaneous. If $\Delta G$ is positive, the reaction will not be instant, but will require a supply of additional energy in order to create a reaction. If $\Delta G$ equals zero, the reaction is considered to be at its "equilibrium state." $\Delta H$ represents the change in enthalpy, or total heat content, of a system, wherein $\Delta H$ is equal to the sum of the internal energy and the product of pressure multiplied by the volume. T represents the temperature at any formation depth, and $\Delta S$ represents the change in entropy of the system. Entropy is the thermodynamic quality that represents the unavailability of a system's thermal energy for conversion into mechanical work, which is often interpreted as the degree of disorder or randomness in the system. As those having skill in the art will recognize, A represents the difference between two conditions. In order to determine the changes in the differences, those skilled in the art would perform the derivative of the above Equation 1, while keeping $\Delta V$ and $\Delta S$ constant, producing:

$$d\Delta G=dP\Delta V-dT\Delta S \quad \text{("Equation 2")}$$

At Equilibrium Conditions, where there is no change in the $\Delta G$, $d\Delta G$ equals zero. Thus at Equilibrium Conditions, $dP\Delta V-dT\Delta S=0$. Expanding this equation results in: $dP\Delta V=dT\Delta S$. Dividing both sides of this equation by dT results in: $(dP/dT)\Delta V=\Delta S$. Then, when dividing both sides of the equation by $\Delta V$, those skilled in the art will recognize that the result is Clapeyron's Equation:

$$(dP/dT)=\Delta S/\Delta V$$

Figure 1:
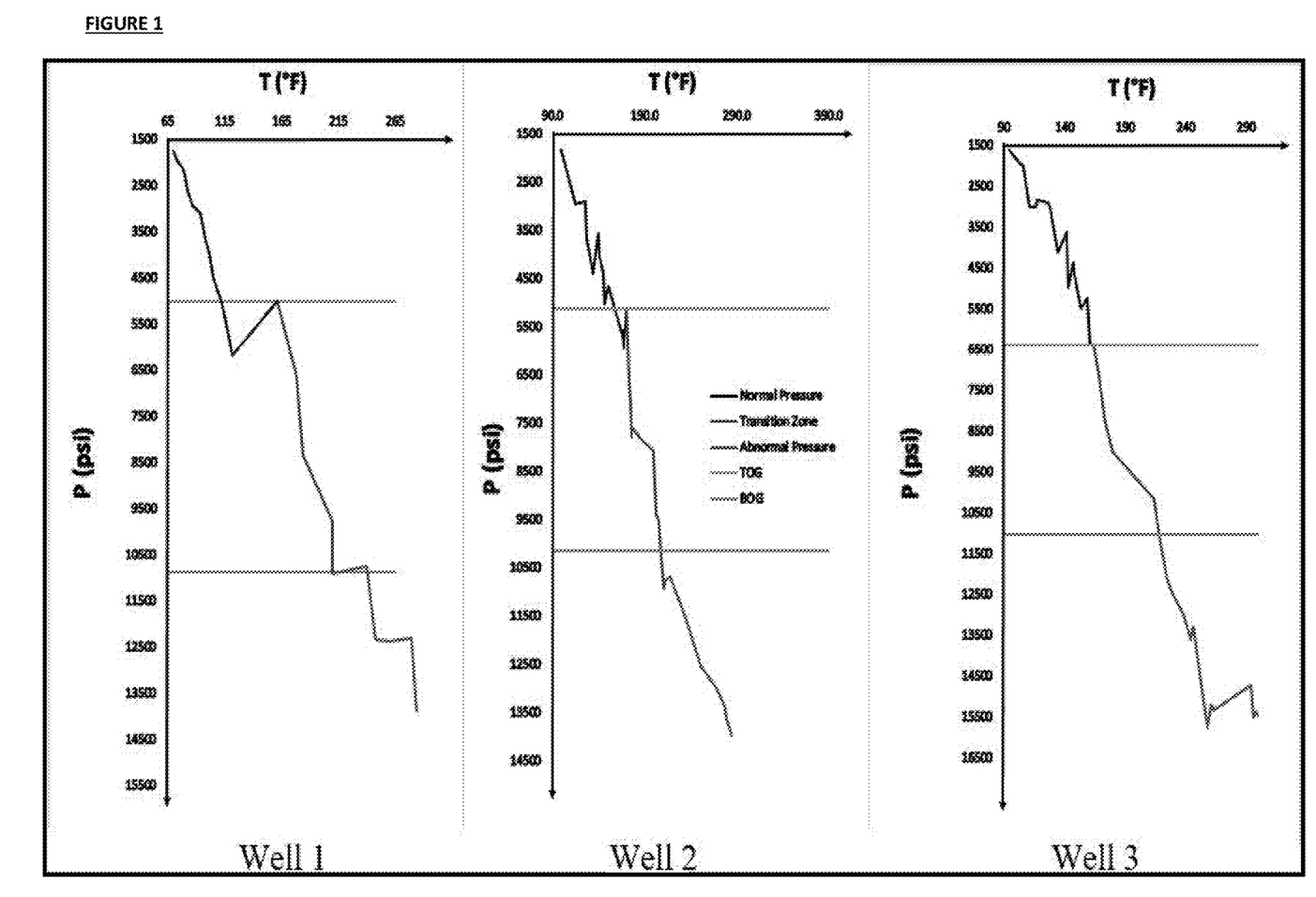
FIG. 1 is a pressure versus temperature plot of three wells that were previously drilled. Said wells are used as examples throughout this disclosure.

A careful examination of Clapeyron's Equation indicates that a plot of pore pressure versus temperature generates a curve whose slope is equal to dP/dT, and that slope is also equal to $\Delta S/\Delta V$, indicating that the slope is a measure of energy per unit volume—or, pressure. This pressure is the additional pore pressure that is induced by temperature. This disclosed invention tracks the deviations from equilibrium conditions as the user drills from the surface to any desired depth. As a demonstrative of this method, understood to be an example alone, the thermal equilibrium of three wells were studied in the field. FIG. 1 shows an example of a P-T plot for the field wells.

Next, this method consults the resistivity log for the site where the well is being planned. For oil and gas well drilling, resistivity logging is often used to assist in determining how porous the rock materials are. Resistivity logging is a known method of well logging that characterizes the rock or sediment by measuring its electrical resistivity. Most rock materials, especially those where oil and gas wells are drilled, are natural insulators, while their enclosed fluids are conductors (with the exception of hydrocarbon fluids). When a formation is porous and contains salty water, the overall resistivity will be low. However, if the formation contains hydrocarbon, or contains very low porosity, the resistivity will be high. This logging alerts the user as to whether the formation is permeable or not, as well as additional data that can be used to calculate the temperature at a given depth. In an additional embodiment, the relativity log and entire well log is already available from outside sources.

Figure 3:
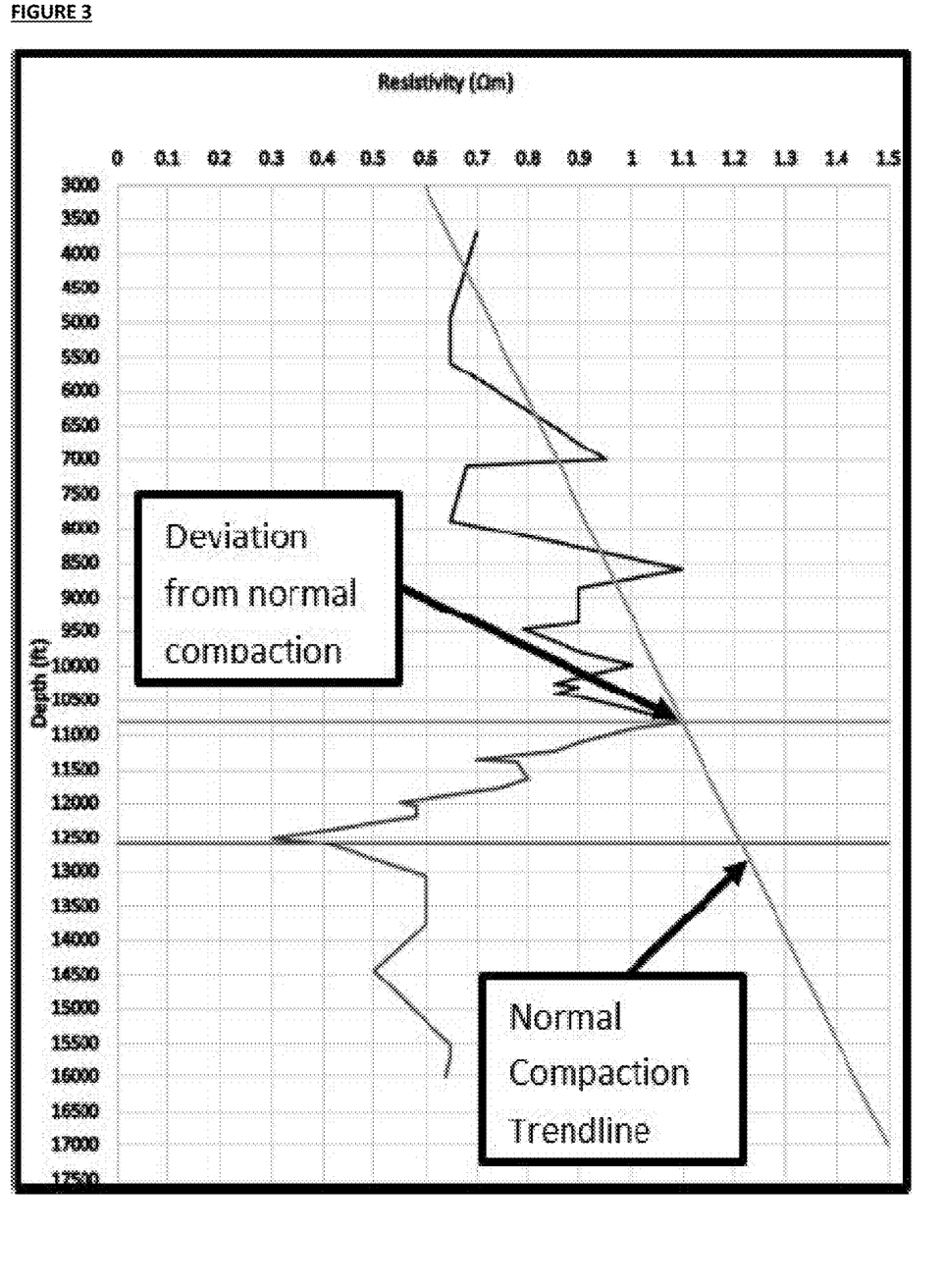
FIG. 3 is resistance versus depth plot for one of the three wells.

After the resistivity data is collected, a plot must be made of the resistivity versus the depth, an example of which is seen in FIG. 3. Using the resistivity logs, at the bottom of the tangent (slope line), the user will establish shale baseline for the depth interval of interest on the spontaneous ("SP") track. For the normal compaction region, the user selects any shale resistivity point on the shale baseline where the slope of the SP increased downward to its lowest point and the corresponding slope on the resistivity track reduces towards the bottom of the shale resistivity, as shown in FIG. 3. This process is repeated for the rest of the points selected by the user from the resistivity log. Using these data points, a plot of resistivity v. depth graph similar to that seen in FIG. 3 is produced. On that same graph, the user plots the normal compaction trend line ("NCTL") to indicate deviation from the normal compaction at sections below the normal trend. The NTCL represents the sonic and resistivity values if the pore pressure was normal (hydrostatic), and methods for calculating the NCTL are known in the art. The resistivity value (R(sh normal)), represent the normal shale resistivity values. The plotted resistivity values that deviate from the normal values represent the observed shale resistivity values.

Figure 2:
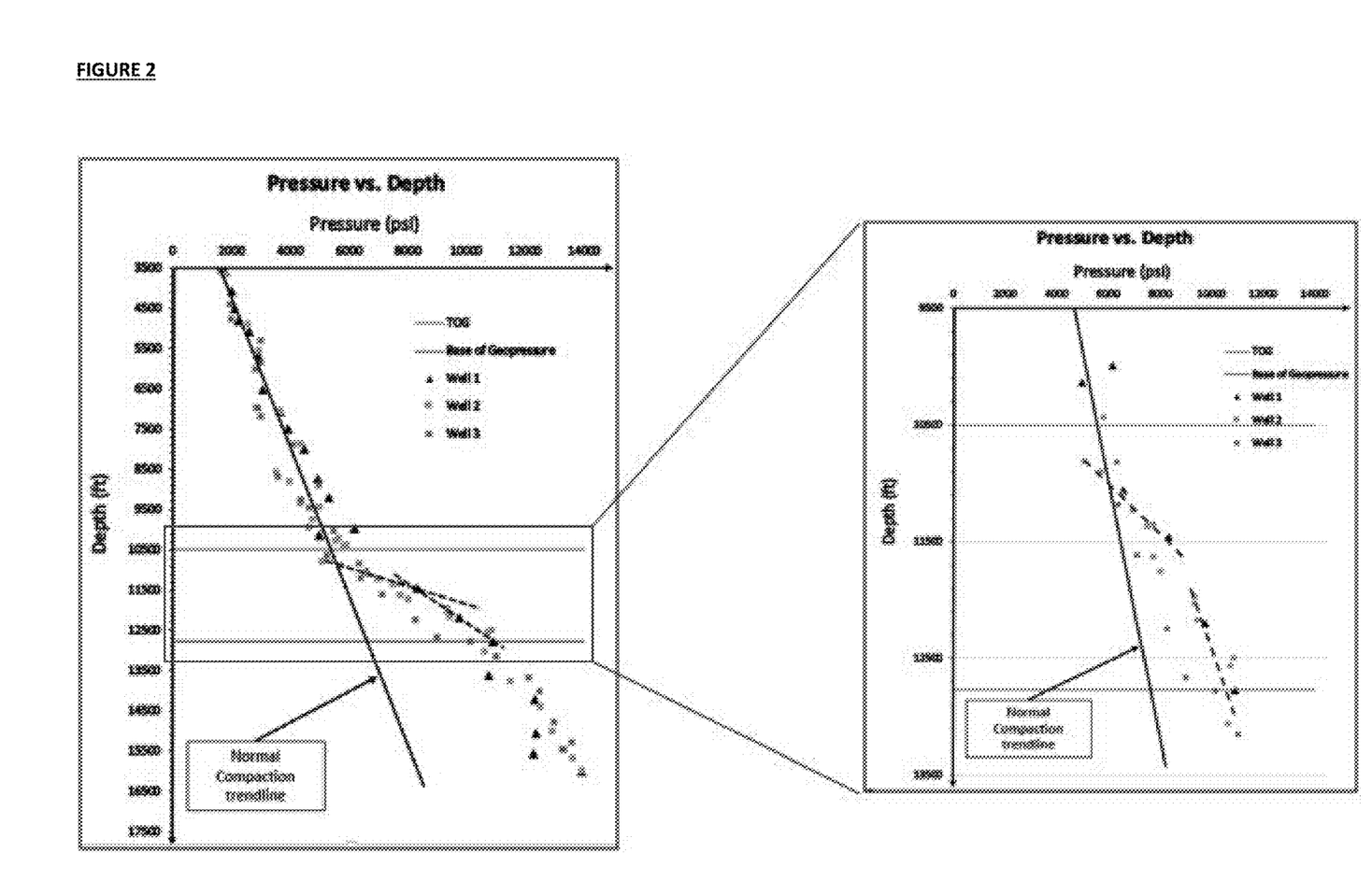
FIG. 2 is a consolidated pressure versus temperature plot for all three wells that were previously drilled. There is also an enlargement of the "Transition Zone", demonstrating the change from normal to abnormal pressure.

Using the information obtained through available well logs or by performing well logging, the user will then identify the Top of Geopressure by locating and estimating the magnitude of pressure at depth in the normal and transition to abnormally pressured zones. Using Equation 1, the resistivity points from the previous chart can be used to determine the pressure measured in psi. The user then applies the pressure calculations and the ratio of observed shale resistivity in abnormally compacted zones and the shale resistivity in the normally compacted zones to Eaton's Correlation. For the field example, the "normally" compacted zone was defined as shale resistivity where the mud weight is 9.0 ppg, and the pressure versus depth plot for the field wells can be seen at FIG. 2. In FIG. 2, the Transition Zone is shown as residing between the two horizontal lines indicating the Top of Geopressure and Base of Geopressure. In that Transition Zone, there is present a double slope, indicating the existence of at least two different pressure regimes within the same Transition Zone. Discovering the actual pore pressure content and the corrected fracture pressure of the Transition Zone is an important step, as the accurate prediction of the pore pressures and fracture gradients is necessary for proper drilling of wells.

Next, it must be understood that resistivity or conductivity is related to thermal energy (i.e., Gibbs free energy), through the following relationship, known to those skilled in the art as the "Nerst Equation":

$$E = E_s - \left(\frac{RT}{nF}\right) Ln\left(\frac{R_1}{R_2}\right)$$

In the above equation, E is the cell potential energy (voltage energy, measured in Joules/Coulomb) at any given state in the earth, $E_s$ is the standard state potential energy (voltage energy) at standard pressure and temperature, R=8.314 is the universal gas constant in Jules/mol-degree Kelvin, n is moles of flowing electrons, F or Faraday's constant equals 96,485 Coulombs per moles of electricity, and Q represents the reaction quotient in the earth reactor. The Nearst Equation can be rewritten in terms of its thermodynamic energy equivalent:

$$E = E_s - \left(\frac{RT}{nF}\right) LnQ$$

$$\Delta G = \Delta G_s - \left(-\frac{RT}{nF}\right) LnQ$$

$$\Delta G = \Delta G_s + \left(\frac{RT}{nF}\right) LnQ$$

By multiplying both sides of the above equation by nF, the user obtains (hereinafter Equation $):

$$nF\Delta G = nF\Delta G_s + (RT)LnQ$$

Comparing the Nearst Equation to the above thermodynamics energy form of the equation, it is noted that $\Delta G = -nFE$ and $\Delta G_s = nFE_s$.

The user then takes the thermodynamic equilibrium condition as the normally pressured zone and the conditions which deviate from equilibrium as the abnormally pressured zone. This invention incorporates the thermally induced abnormal pressure locations—the Top of Geopressure and Base of Geopressure positions along the depth—as accurately as the data allows, and calculate, as accurately as the data will permit, the magnitude of the pore pressure and the fracture pressure at each depth. In order to find the equilibrium, the above Equation $ to consider that at equilibrium, $\Delta G=0$. Consequently, the term Q (reaction quotient) becomes K, the equilibrium constant, indicating that the system is in equilibrium or a normally pressured zone.

$$\Delta G = \Delta G_s + \left(\frac{RT}{nF}\right) LnQ = 0 \text{ at equilibrium}$$

Then Q=K, or the standard normal condition of the thermal energy:

$$\Delta G_s = -RTLnK$$

Figure 4:
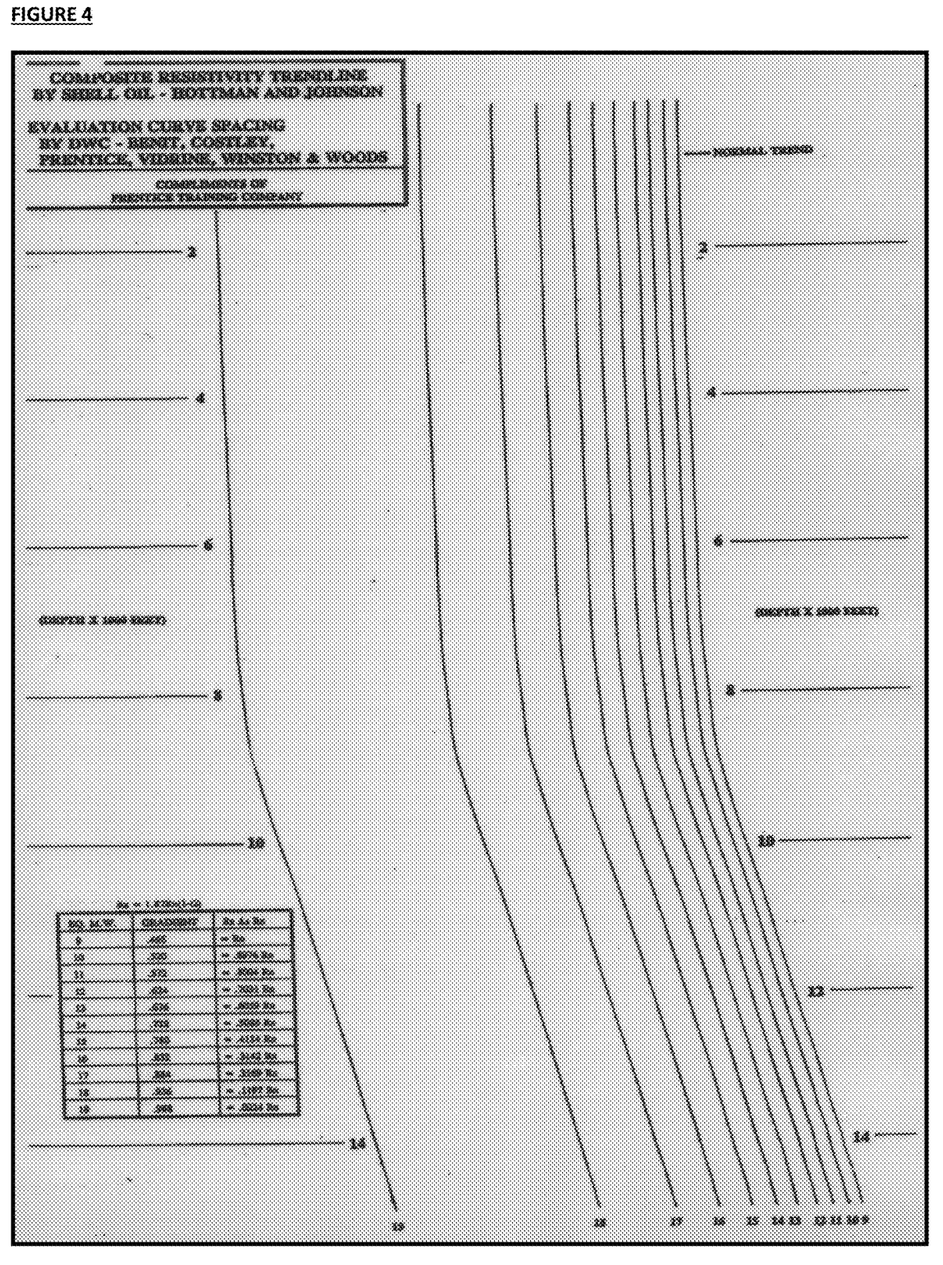
FIG. 4 is an exemplary Drilling Well Control (DWC) resistivity overlay plot.

To then augment the P-T plot process, the known DWC method of calculating formation pore pressure is used. Using a DWC composite resistivity trend line overlay, an example of which can be seen at FIG. 4, the user plots the resistivity points on three cycle semi-log graph paper. In the preferred embodiment, the resistivity points are plotted using the middle cycle on the semi-log paper. Construction of the DWC overlay, shown in FIG. 4, is based on assumed Gradients of G=0.465 Psi/ft salt water at depth and temperature, 1.0 psi/ft overburden, and a data base that includes temperature effect provided by the following equation (hereinafter "Equation 2"):

$$\frac{R_a}{R_n} = 1.87(1.0 - G)$$

Next, the user draws the mud weight lines on the same semi-log paper, and then determines the associated mud weight of each resistivity point using the following equation. The mud weight is the density of the drilling fluid and is normally measured in pounds per gallon ("ppg"). The mud weight is then converted from ppg to equivalent pressures in psi. This pressure will be referred to as the Drilling Well Control ("DWC") Pressure. The conversion is performed using the following equation:

$$DWC \; Pressure = 0.052(Mud \; Weight)(Depth)$$

Figure 5:
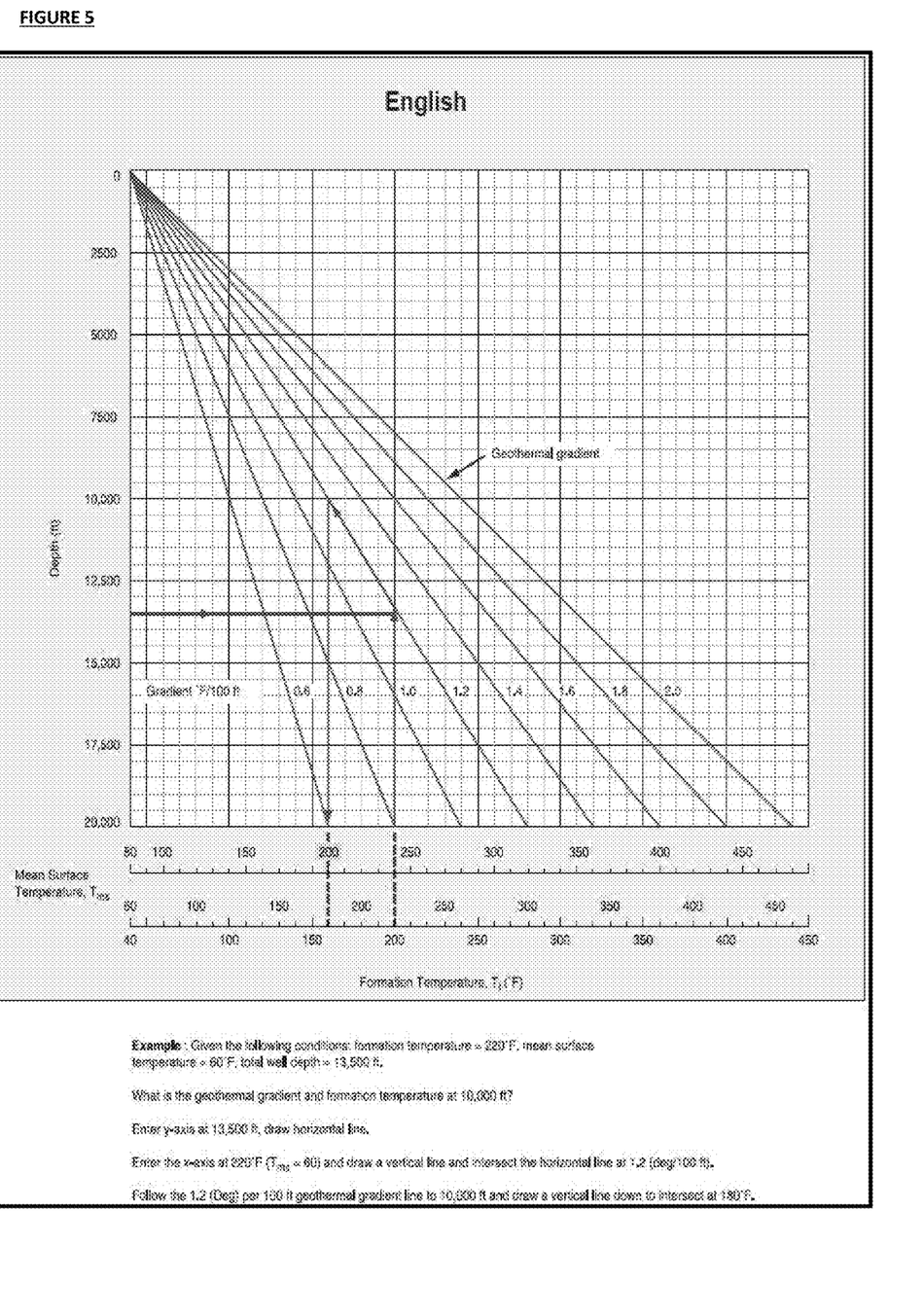
FIG. 5 is an exemplary geothermal gradient chart.

To construct the P-T equilibrium diagram, the user must estimate the temperature gradient. This estimate can be done using thermal logs, logging while drilling, by using standard charts available in the industry, such as that seen in FIG. 5, or by using the following equation and the information recorded on the resistivity log heading:

$$\frac{\frac{dT}{dZ}}{100 \text{ ft}} = \frac{T_2 - T_1}{X_2 - X_1}$$

In this equation, dT/dZ is the temperature gradient (° F./100 ft), $X_2$ is the depth (in feet) of the interest whose temperature is being calculated, $X_1$ is the depth whose temperature is already known, $T_1$ is the temperature at $X_1$ depth, and $T_2$ is the temperature at $X_2$ depth.

To generate the P-T plot, it is necessary next to establish the thermal equilibrium of the particular interest location. The user plots the DWC pressure versus temperature three times, one each for the normal, transition zone, and abnormal pressure regions. An equation is then fit to each region by fitting a trend line to the individual curves on the graph. Then the user chooses an equation with the highest $R^2$ (Coefficient of Determination or R squared) value as the "best-fit" equation.

Figure 6:
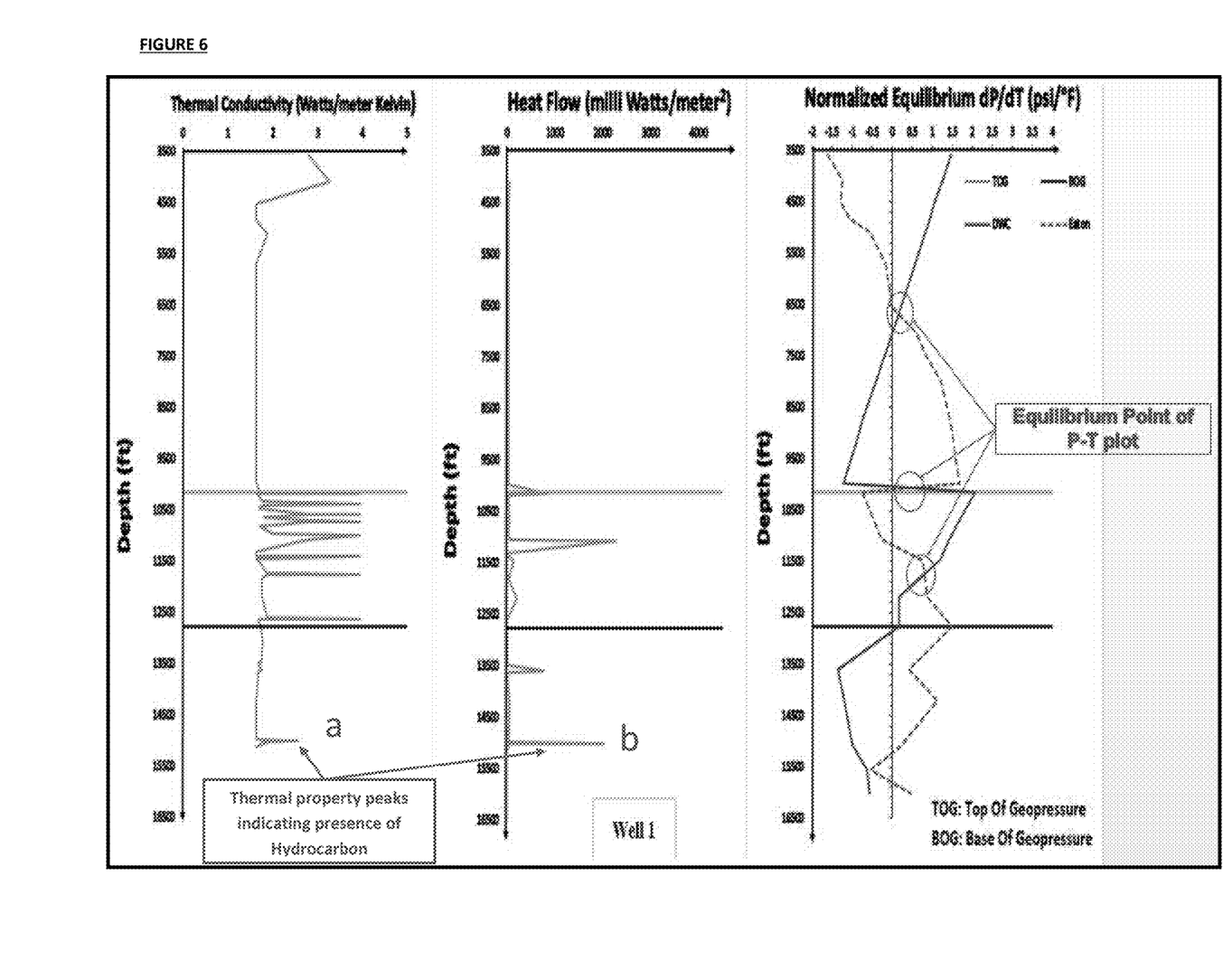
FIG. 6 is a composite plot of formation thermal conductivity, heat flux through formation, and the normalized plot of dP/dT using Eaton's and DWC methods, side by side for well #1 in the described field example.

Then the Eaton's and DWC results are both plotted, along with the thermodynamic properties of the formation (e.g., thermal conductivity and heat flux (flow) at each depth point, in one diagram, as shown in FIG. 6. To make the data from the Eaton's correlation and the DWC method compatible, the data must be normalized before generating the P-T plots, specifically the slopes of each segment in the normal (equilibrium), transition (deviation from equilibrium), and abnormal (deviation from equilibrium) zones. In the preferred embodiment, the Z-score normalization method is used; however, those having skill in the art will recognize that other normalization methods can be applied. To normalize the data using the Z-score method, the mean (M) of the dP/dT values is calculated. Then the standard deviation for all of the dP/dT values is determined using the following equation:

Standard deviation=$\{\Sigma(Y_n-M)^2/(N-1)\}^{1/2}$

In the above equation, N is equal to the number of data sets and $Y_n$ represents the particular dP/dT value. To calculate the Z-score, the following equation is used:

$$[Z]_n = \frac{Y(n) - M}{SD}$$

The Z-score values represent the normalized dP/dT values. The user then plots the normalized Eaton's gradient and the DWC Pressure gradient on the same plot in order to identify the depth that compaction induced pressure is significant and how much thermally induced pressure is present. This change in induced pressure dominance, occurs after the system achieves "Thermal Equilibrium" i.e. where the Eaton's gradient and the DWC Pressure gradient plot cross each other (Crossover Point or Equilibrium Point) as seen in FIG. 6. Each segment of the normalized slope (dP/dT) is fit using a best fit equation. By plotting both the normalized Eaton's dP/dT and DWC dP/dT side by side, the user pinpoints where at depth and by how much the thermally induced pressure dominates and determines where and by how much the compaction induced pressure dominates.

With the data normalized, the user determines the lithology composition of the location of interest. Lithology composition is determined visually by estimating how much sand and shale the rock is made from at any depth of interest, and can be determined using a spontaneous (SP) log using the following steps. First, the user establishes a baseline for clean sand and shale. Next, using the SP track on the resistivity log, the user visually estimates how much reduction in shale content is present. The user then plots the shale resistivity values on a sheet of semi-log paper against the dept. Mud weight lines, in pounds per gallon, are then drawn on the semi-log paper using the DWC resistivity overlay. These mud weight values are then converted into the equivalent pressure in PSI. In an alternative embodiment, lithology compositions are instead gathered from cores or cuttings data.

To calculate the thermal conductivity, known vertical thermal conductivity values for standard shale and sand values are reviewed alongside the lithology compositions. For ease of calculation, temperatures are converted from degrees Fahrenheit to Kelvin with the exception of the dP/dT plot, which will remain in degrees Fahrenheit. Feet are also converted to meters, with the exception for P-T and the normalized dP/dT plots. Then, using the percentages of the rock composition, the thermal conductivity can be determined. For example, the thermal conductivity for typical shale is 1.64 Watts/meter-Kelvin and sandstone is 3.95 Watts/meter-Kelvin. For a 60 percent shale and 40 percent sand composition, the following thermal composition is found:

(1.64×0.6)+(3.95×0.4)=2.564 Watts/meter-Kelvin

To calculate heat flow, the following equation can be used:

$$q = -\lambda\left(\frac{dT}{dZ}\right)$$

In the above equation, q represents heat flow (flux), $\lambda$ is the thermal conductivity, and dT/dZ represents the Geothermal gradient. The negative sign indicates heat flow is from the hotter to the colder region.

The user then places the graphs for thermal conductivity, heat flow, and the combined normalized equilibrium dP/dT next to each other as seen in FIG. 6. Reviewing the normalized equilibrium dP/dT plot, the normally pressured zone (at equilibrium), show the DWC dP/dT is significantly void of noise; however, the Eaton's dP/dT shows some noise in the normally compacted zone. Consequently, the DWC signal can be used to filter noise from Eaton's dP/dT through convolution. In the normal compaction section of the formation, the dP/dT trend indicates that the effect of temperature is weak and the effect of compaction in generating pore pressure is dominant and strong.

The first crossover of the DWC dP/dT and Eaton's dP/dT lines (hereinafter "First Crossover") provide the exact location of the Top of Geopressure, which is 10,137 ft in the present field example. Below this depth of crossover point, the user discovers that in the upper part of the Transition Zone, the effect of temperature becomes stronger and dominant in generating abnormal pore pressure as the DWC plot deviates to the right.

In the Transition Zone, at least three slopes are present, indicating to the user that each one requires a specific mud weight to balance the formation pore pressure, and correctly estimate the fracture pressure without exceeding the Formation Fracture Pressure. In the Transition Zone, the majority of the upper part of the zone is dominated by thermally induced pore pressure. After the second crossover of the DWC dP/dT and Eaton's dP/dT lines (hereinafter "Second Crossover"), the user can see that the compaction trend becomes the dominant force in developing the formation of pore pressure and formation fracture pressure.

The thermal conductivity and the heat flux plots demonstrate non-events in the normally compacted segment of the formation, which is at equilibrium. This behavior confirms the behavior of the dP/dT plot in the "normally compacted zone." In contrast to the neutral behavior in this segment, significant changes can be seen in the Transition Zone, where the user can observe a number of incidents. First, the heat flux shows a significant change in amplitude at the Top of Geopressure, which is located exactly at the point of First Crossover. Second, at the point of First Crossover, the thermal conductivity of the formation, especially within the upper part of the Transition Zone exhibits a significant change in amplitude. Thus, the invention permits the user to see that both observations of the dP/dT confirm the effect of thermal properties in generating the thermally induced pore pressure and consequently formation fracture pressure in the upper part of the Transition Zone. The user can now take thermal conditions into account when planning the well drilling.

An additional incident evident on the heat flux and thermal conductivity plot is that the amplitude gradually diminishes after the Second Crossover. This observation demonstrates that in the lower part of the transition zone, the compaction induced pore pressure becomes dominant and the thermally induced pore pressure becomes weaker.

Further, in FIG. 6, the plot of thermal conductivity at point "a" and the heat flux at point "b" indicate another useful feature of this inventive method—the formation at these points is a "gas producing" formation. When the amplitude of these two plots increases together on the right, in the same direction, it is an indication of the existence of a hydrocarbon reservoir, since gases cool sand much differently than liquids. In short, the cooling effect of the reservoir fluids, the type of reservoir fluids, and the maturity of the hydrocarbons within the specific thermal windows control the amplitude of the two thermal property plots in FIG. 6.

Now that the above properties of the well have been determined, the user inputs these features into a geological basin simulator. In one embodiment, a one dimensional simulator, such as BasinMod (a commercial simulator developed and marketed by Platt River Associates (PRA)) is used. However, as heat flow can be in both vertical and horizontal directions in the earth's subsurface, a three dimensional simulator could also be used. Those having skill in the art will recognize that a basin could be simulated without the use of software, or through other software available in the art currently or in the future. Continuing with the field example, the structural map of the field is shown in FIG. 7, including a ground fault present in the land, and the outcome of the simulation is shown in FIG. 8.

Figure 7:
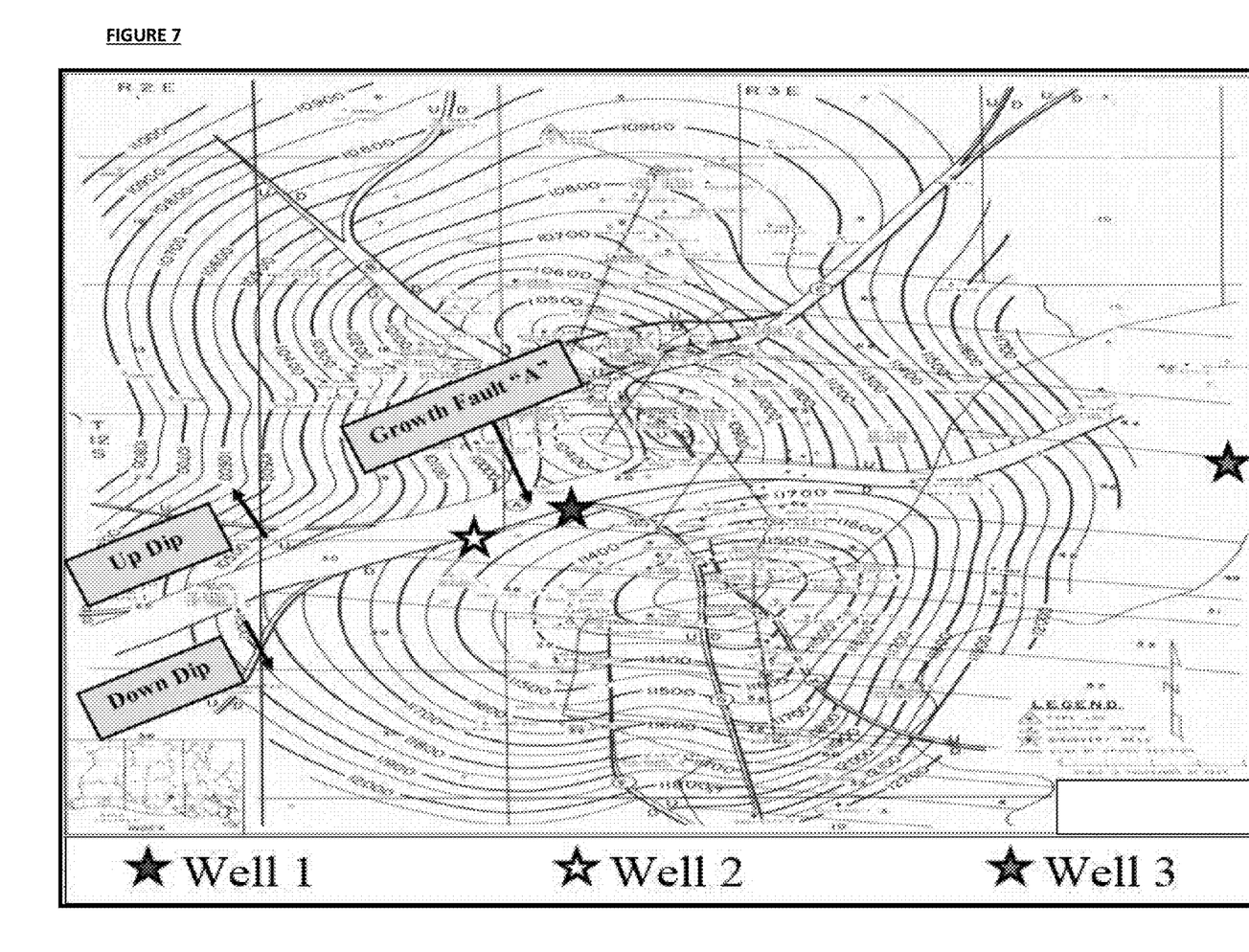
FIG. 7 is a structural map of the field for the three wells, showing the three wells and the fault.
Figure 8:
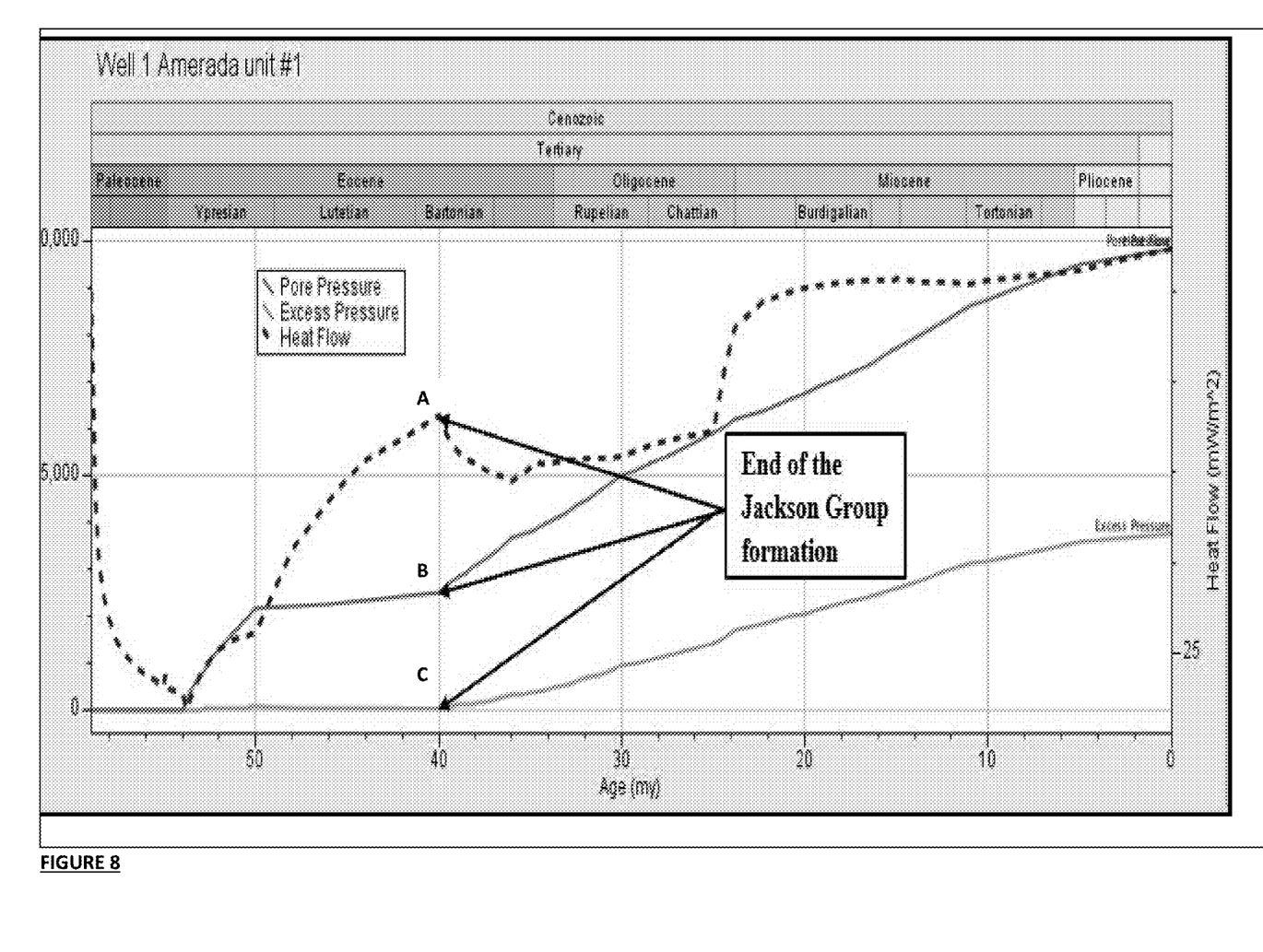
FIG. 8 is a basin simulator generated chart that compares pore pressure, excess pressure, heat flow, and geological age in millions of years for well #1 in the field.

The simulation results seen in FIG. 8 for well #1, which was drilled near the fault depicted in FIG. 7 reveals several key pieces of information that would have been unavailable without the method disclosed herein. First, the start of the increase in pore pressure is synonymous with heat flow out of the system, as seen between 40-25MY (Point A). This indicates the storing of more heat in the formation at Point A. The rise in excess pressure plot is synonymous with the decreasing heat flow out of the system (Point B). This is additional evidence of storing heat and buildup of thermally induced pore pressure at Point B.

40MY is the age when Jackson formation formed (Point C). The Jackson formation is a "geological seal" in the example field. The formation of the seal happens at approximately 170° F., indicating that an appropriate temperature window for the continued precipitation of limestone (referred to as "het limestone"). In addition to the shale formation, the limestone seal location is very close in depth to the Top of Geopressure seen in FIG. 2.

Heat energy builds up until 24MY and a temperature of approximately 190° F. At this point, heat flow out of the system rises. This indicates that the seal leaked at that temperature and time due to excess pore pressure build up. This is analogous to a relief valve opening automatically to relieve a thermally induced pressure.

The relief valve seen in FIG. 7 is a fault. The fault and broken seal open the pathway to migration of fluids to the other parts of the structure.

As demonstrated in this disclosure, by mapping the temperature increase at deeper depths within the subsurface along with considerations for the enabling conditions of the environment present, excess pressure is induced and can now be accounted for in planning well drilling. Hydrocarbon bearing formations analyzed in wells in the field example indicate a potential economic benefit by using this method to identify hydrocarbon flow to the surface. Considering this, it is understood that this approach can be used to locate hydrocarbon reservoirs, similar to how the formation petrophysical properties such as resistivity and porosity, combined with biomarkers, are used today in formation evaluation.

The described features, advantages, and characteristics may be combined in any suitable manner in one or more embodiments. One skilled in the relevant art will recognize that the varying components of this design may be practiced without one or more of the specific features or advantages of the particular embodiment. In other instances, additional features and advantages may be recognized in certain embodiments that may not be present in all embodiments.

The invention claimed is:

1. A method for drilling a well comprising
   a. selecting a plurality of drill locations for at least one well;
   b. modeling deviations from equilibrium conditions relative to a plurality of depths at each of said plurality of drill locations;
   c. basin modeling a plurality of thermal properties of each of said plurality of drill locations and performing basin simulation using a basin simulator to generate plots of thermal conductivity, heat flow, and combined normalized dP/dT at multiple depth points;
   d. comparing the plots of the thermal conductivity, heat flow, and combined normalized dP/dT for each said plurality of drill locations location;
   e. based on the basin modeling and comparing steps, identifying a geological seal for at least one drill location, and
   f. drilling at least one well at the at least one drill location where the geological seal indicates existence of a hydrocarbon reservoir and acts as a barrier to prevent leakage of pressure and temperature simultaneously.

2. A method for drilling an oil or gas well comprising:
   a. basin modeling a plurality of thermal properties and performing basin simulation using a basin simulator to create plots of thermal conductivity, heat flow, and normalized dP/dT for at least one potential drilling location;
   b. analyzing a slope of each of said plots to determine a Top of Geopressure for said at least one drilling location;
   c. calculating the pore pressure and fracture gradient based on said Top of Geopressure for said at least one drilling location;
   d. selecting said at least one drilling location based on said pore pressure and said fracture gradient; and
   e. drilling a well at said at least one drilling location to ensure safe and economic recovery of hydrocarbon resources.

3. The method of claim 2 wherein said creating step further comprises:
   a. modeling deviations from equilibrium conditions relative to a plurality of depths of said well at said drilling location;
   b. gathering resistivity data of said drilling location to determine a plurality of normal resistivity values;
   c. determining the observed shale resistivity values, wherein said observed shale resistivity values consists of resistivity values that deviate from said normal resistivity values;
   d. selecting a plurality of pressures, wherein said plurality of pressures is at least one from each group consisting of: normal pressured zone of said drilling location, transition pressure zone of said drilling location, and abnormal pressure zone of said drilling location;

e. applying said plurality of pressures and said observed shale resistivity values to the Eaton's Correlation to create Eaton's Correlation data;
f. calculating the pore pressure and facture pressure at a plurality of depths, to determine the Drilling Well Control Pressure data, wherein the thermodynamic equilibrium condition is considered said normal pressured zone and the non-thermodynamic equilibrium condition is considered said abnormal pressured zone;
g. constructing a pressure-temperature equilibrium diagram from said Eaton's Correlation data and said Drilling Well Control Pressure data;
h. determining a lithology composition of said drilling location;
i. plotting thermal conductivity relative to a plurality of depths of said drilling location to form a thermal conductivity plot;
j. plotting heat flow relative to a plurality of depths of said drilling location to form a heat flow plot.

4. The method of claim 3 wherein said modeling step is performed by plotting pore pressure versus temperature to obtain a pore pressure temperature plot, wherein the slope of said pore pressure temperature plot is equal to dP/dT.

5. The method of claim 3 wherein said determining step comprises plotting resistivity relative to a plurality of depths of said well.

6. The method of claim 3 wherein said determining step further comprises:
a. plotting said resistivity data relative to a plurality of depths of said well to create a plurality of resistivity logs comprising at least one resistivity track;
b. establishing a shale baseline for at least one interval of said plurality of depths, on a spontaneous track;
c. selecting at least one shale resistivity point on said shale baseline wherein the slope of said spontaneous track is downward and the corresponding slope on said resistivity track is downward; and
d. repeating said selecting step for a plurality of shale resistivity points on said resistivity log to create a plot of resistivity relative to a plurality of depths of said well.

7. The method of claim 5 or 6 further comprising plotting a normal compaction trend line on said plot of resistivity relative to a plurality of depths of said well.

8. The method of claim 3 wherein said calculating step further comprises:
a. calculating the thermodynamic equilibrium condition of said well;
b. plotting said resistivity data on three cycle semi-log graph to create resistivity data points;
c. drawing mud weight lines on said semi-log graph;
d. determining the associated mud weight of each of said resistivity data points to determine the Drilling Well Control Pressure;
e. estimating a temperature gradient; and
f. plotting said Drilling Well Control Pressure relative to said temperature gradient.

9. The method of claim 3 wherein said constructing step further comprises normalizing said Drilling Well Control Pressure data and said Eaton's Correlation data.

* * * * *